United States Patent Office 2,911,426
Patented Nov. 3, 1959

2,911,426

PREPARATION OF CYANOALKYLSILANES EMPLOYING TRIHYDROCARBYL ARSINE CATALYSTS

Victor B. Jex and John E. McMahon, Buffalo, N.Y.

No Drawing. Application June 28, 1957
Serial No. 668,622

8 Claims. (Cl. 260—448.2)

This invention relates to a process for the production of new compositions of matter comprising the beta-cyanoethylsilanes. More particularly, the invention is concerned with a novel process for the production of beta-cyanoethylsilanes which contain at least one hydrolyzable group bonded to the silicon atom thereof. This application is a continuation in part of application, Serial No. 555,201, filed December 23, 1955.

By reacting an alpha-beta olefinically unsaturated nitrile of the type represented by acrylonitrile, methacrylonitrile, crotononitrile and the like with a silane containing at least one hydrogen atom and at least one hydrolyzable group bonded to the silicon atom thereof there is produced a mixture of reaction products from which an alpha-cyanoalkylsilane can be recovered. The overall reaction which takes place can be represented by the following equation, which depicts, for the purpose of illustration, the reaction between acrylonitrile and trichlorosilane.

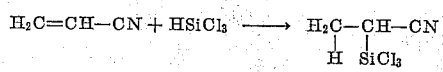

The present invention is based on our discovery that an alpha-beta olefinically unsaturated nitrile of the type represented by acrylonitrile, methacrylonitrile, crotononitrile and the like can be caused to react with a silane, containing at least one hydrogen atom and at least one hydrolyzable group bonded to the silicon atom thereof, in the presence of a catalyst to produce a beta-cyanoalkylsilane by the addition of a silyl group to the beta carbon atom of such nitrile, that is the olefinic carbon atom further removed from the cyano group of the nitrile, and by the addition of a hydrogen atom to the alpha carbon atom of such nitrile, that is the vicinal olefinic carbon atom. Based on our discovery we have further found that any olefinic nitrile can be caused to react with a silane, containing at least one hydrogen atom and at least one hydrolyzable group bonded to the silicon atom thereof, in the presence of a catalyst to produce a cyanoalkylsilane by the addition of a silyl group to the olefinic carbon atom further removed (*) from the cyano group of the nitrile

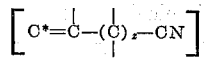

and by the addition of a hydrogen atom to the olefinic carbon atom closer to the cyano group of the nitrile. The overall reaction which takes place can be represented by the following equations which depict for the purpose of illustration the reaction between acrylonitrile and trichlorosilane and the reaction between allyl cyanide and triethoxysilane:

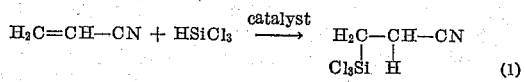

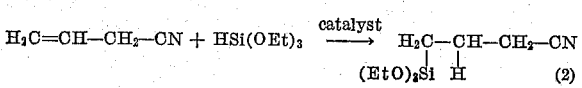

Our process can be carried out by forming a mixture of the olefinic nitrile, a silane containing at least one hydrogen atom and at least one hydrolyzable group bonded to the silicon atom thereof and a small or catalytic amount of hydrocarbyl substituted arsines as catalyst for the reaction and heating the mixture to a temperature sufficiently elevated to cause the starting materials to react. There results or is produced a cyanoalkylsilane by the addition of a silyl group to the olefinic carbon atom of the nitrile further removed from the cyano group and by the addition of a hydrogen atom to the olefinic carbon atom of the nitrile closer to the cyano group. By the term "hydrocarbyl," as used herein, is means a monovalent organic group composed of carbon and hydrogen and includes saturated as well as unsaturated groups.

The silane starting materials containing at least one hydrogen atom and at least one hydrolyzable group bonded to the silicon atom thereof, which we employ in our process can be represented by the following general formula:

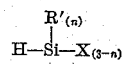

wherein R′ represents a hydrogen atom or a hydrocarbyl group, preferably a saturated aliphatic or cycloaliphatic hydrocarbyl group as for example, an alkyl group such as methyl, ethyl, propyl, butyl, pentyl and the like and a cycloalkyl group such as cyclopentyl, cyclohexyl, methylcyclopentyl, ethylcyclohexyl, and the like or an aromatic hydrocarbyl group, for example, an aryl group such as phenyl, naphthyl, tolyl, methylnaphthyl and the like, X is a hydrolyzable group such as a halogen atom, preferably a chlorine atom, or a hydrocarbyloxy group, preferably an alkoxy or an aryloxy group such as methoxy, ethoxy, propoxy, phenoxy and the like, and $n$ is a whole number having a value of from 0 to 2. Illustrative of the silane starting materials are trichlorosilane, triethoxysilane, dichlorosilane, diethoxysilane, monochlorosilane, monoethoxysilane, methyldichlorosilane, ethyldiethoxysilane, diethylethoxysilane, dimethylchlorosilane, butylethylchlorosilane, phenyldichlorosilane, phenylethylethoxysilane, dipropylphenoxysilane and the like.

The olefinic nitrile starting materials which we can employ in the practice of our invention are the aliphatic mono-olefinic nitriles which contain from three to ten carbon atoms to the molecule. Illustrative of such olefinic nitriles are acrylonitrile, methacrylonitrile, allyl cyanide, 1-cyano-3-butene, 1-cyano-4-pentene, 1-cyano-1-hexene and the like. Our preferred nitrile starting materials are the alpha-beta olefinically unsaturated nitriles, namely those nitriles in which the unsaturated grouping

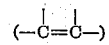

is directly bonded, through one of the carbon atoms thereof, to the carbon atom of the cyano group. Such olefinic nitriles are commonly known as the vinyl-type cyanides and can be represented by the general formula:

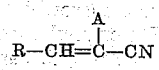

where R can be a hydrogen atom or an alkyl group as for example methyl, ethyl, propyl, butyl and the like and A is either a hydrogen atom or a methyl group. Illustrative of such vinyl-type cyanides are acrylonitrile, methacrylonitrile, crotononitrile and the like.

The hydrocarbyl substituted arsines which we employ as catalysts in our process direct the addition of the silyl group of our starting silane to the olefinic carbon atom of our starting nitrile further removed from the cyano group thereof and the addition of the hydrogen atom of the starting silane to the vicinal olefinic carbon atom.

Such catalysts are the trihydrocarbylarsines and can be illustrated by the formula:

wherein R'' represents a hydrocarbyl group, as for example an alkyl or aryl group, which need not be necessarily the same throughout the arsine molecules. Illustrative of such alkyl groups are methyl, ethyl, propyl, isopropyl, butyl, isobutyl, pentyl, cetyl, eicosyl and the like; while illustrative aryl groups are phenyl, tolyl, naphthyl and the like. Illustrative of such trihydrocarbyl substituted arsines are: trimethylarsine, triethylarsine, triphenylarsine, methyldiethylarsine, tri-n-butylarsine, and the like.

We have found that the amount of the catalyst employed in our process is not narrowly critical. Thus, amounts of the trihydrocarbylarsines of from as little as about 0.2 part to as much as about 10 parts by weight per 100 parts of the total weight of the starting materials can be favorably employed. We preferably employ the catalyst in an amount of from about 0.3 part to about 3 parts by weight per 100 parts of the total weight of the nitrile and silane starting materials. Amounts of the trihydrocarbyl substituted catalysts in smaller or greater quantities than the favorable range can also be employed. However, no commensurate advantage is obtained thereby.

The olefinic nitrile and silane starting materials can be employed in our process in amounts which can vary from about one-half to 2 moles of the nitrile per mole of the silane. Preferably, the reactants are employed in equimolar amounts. Amounts of either of the starting materials in excess of the ratios set forth above can also be employed; however, no commensurate advantage is obtained thereby.

To facilitate observation and at the same time to favor closer control of the reaction conditions, most of our experimental work was carried out in pressure vessels or bombs, with agitation being provided if desired by continuous shaking. Similar results can be obtained with flowing reactants in apparatus of known design permitting the maintenance of a closed system. In the reactions with which our invention is concerned, it is desirable to maintain sufficiently high concentrations of the reactants (as measured for example in moles per liter of reaction space) to promote effective contact between the molecules to be reacted. When one of the reactants is a gas, or a liquid readily volatile at the reaction temperature, and the reaction mixture is permitted to expand freely on heating, the concentration of that reactant will fall to a low value thus considerably slowing the reaction rate. If, however, the reactants are charged to a closed vessel which is sealed before heating, the initial concentration of any reactant falls off through its consumption by the reaction. If a reactant is a gas, it may be desirable to charge the reaction vessel to a considerable pressure to secure an adequate concentration and reaction rate, and also to supply enough of the reactant to produce an acceptable quantity of the product.

The temperatures which can be employed in carrying out our process are not narrowly critical and can vary over a wide range. For example, temperatures as low as 40° C. and as high as 350° C. can be advantageously employed. When conducting the process of the invention in a closed vessel a temperature in the range from about 75° C. to about 250° C. is preferred. Under such conditions, a reaction period of from about two to about five hours is suitable. Temperatures of from about 175° C. to about 300° C. are preferred when conducting the process in apparatus which provides for the flow of the reactants and products while maintaining the conditions of a closed system. In such systems, where the pressure may range from atmospheric up to 4000 pounds per square inch and higher, the time required for the reaction to take place can be as short as 0.005 minute.

In carrying out the process of our invention the product initially obtained comprises a mixture of compounds including the main cyanoalkylsilane as well as some unreacted nitrile and unreacted silane starting compounds. The cyanoalkylsilane product, formed by the addition of a silyl group to the olefinic carbon atom of the nitrile further removed from the cyano group and by the addition of a hydrogen atom to the olefinic carbon atom closer to the cyano group, which contains at least one hydrolyzable group bonded to the silicon atom thereof, as for example beta-cyanoethyltrichlorosilane, can be recovered therefrom by distillation which is preferably conducted under reduced pressure.

The mechanism of our overall reaction wherein the silyl group is attached to the olefinic carbon atom of the starting nitrile further removed from the cyano group and the hydrogen atom is attached to the olefinic carbon atom closer to the cyano group with the apparent suppression of other addition or reaction products is not known with certainty or fully understood. It is known, however, that upon heating our reactants in the absence of a trihydrocarbylarsine as catalyst other reactions can take place such as: the formation of both silicon- and non-silicon-containing free radicals and complexes, the homopolymerization of the starting nitrile, and even the disproportionation of the starting silane has been observed. In addition, it is known that in the absence of our catalysts, our preferred starting materials can react to produce a mixture from which an alpha-cyanoalkylsilane, wherein the silyl group is attached to the olefinic carbon closer to the cyano group and the hydrogen atom is attached to the other olefinic carbon more remote from cyano group, can be recovered with no beta addition products being detected. One possible explanation for the course which our reaction follows when a silane and an olefinic nitrile react in the instance where the nitrile is a vinyl-type cyanide is that the addition of the silyl group to the olefinic carbon atom more removed from the cyano group of the nitrile occurs through an ionic mechanism while the addition of the silyl group to the olefinic carbon atom closer to the cyano group of the nitrile occurs through a free radical mechanism. If such is the case, then the activation energy required for the reaction, between our starting nitriles and silanes, to proceed by a free radical mechanism is considerably less than that required to cause the reaction to proceed by an ionic mechanism. Consequently in the absence of our catalyst the reaction between an olefinic nitrile and a silane, as for example acrylonitrile and trichlorosilane will produce the alpha-addition product namely, alpha-cyanoethyltrichlorosilane. On the other hand, our trihydrocarbylarsine catalysts apparently have the effect of markedly decreasing the activation energy required for the reaction to proceed by an ionic mechanism and therefore when employed in such reactions, as for example in the above acrylonitrile-trichlorosilane reaction, result in the production of beta-cyanoethyltrichlorosilane.

When the olefinic nitrile is of the type represented by allyl cyanide, that is, where the unsaturated grouping

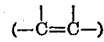

is removed by one or more carbon atoms from the cyano group, our catalyst also functions in promoting the reaction thereof with our silane starting materials to produce addition products by the addition of a silyl group to the olefinic carbon atom more removed from the cyano group, and by the addition of a hydrogen atom to the olefinic carbon closer to the cyano group. By way of illustration, gamma-cyanopropyltrichlorosilane is prepared by reacting allyl cyanide with trichlorosilane in accordance with the subject process.

Bis(cyanoalkyl)silanes are produced in the practice of the process of our invention when our starting nitriles are reacted with silanes containing at least two hydrogen atoms bonded to the silicon atom thereof. In such instances the nitrile starting material is preferably employed in an amount which is at least twice the number of moles of the starting silane. Along with the desired bis compound, there is present in the reaction mixture the cyanoalkyl hydrogensilane. By way of illustration, when two moles of acrylonitrile are reacted with one mole of dichlorosilane in the presence of our trihydrocarbyl substituted hydrides there is obtained, bis(beta-cyanoethyl)-dichlorosilane and beta-cyanoethylhydrogendichlorosilane. Alternatively, cyanoalkyl hydrogen silanes can be used as starting materials for producing bis(cyanoalkyl)silanes. For example, the beta-cyanoethylhydrogendichlorosilane is further reacted with an additional amount of the starting nitrile to form bis(beta-cyanoethyl)dichlorosilane. In this manner the two cyanoalkyl groups are attached to each silane molecule by two distinct reaction steps. Still in accordance with our invention, the tris compounds can also be obtained by using as the starting material a silane containing at least three hydrogen atoms bonded to the silicon atom thereof. The tris compounds can be prepared by attaching the three cyanoalkyl groups to each silane molecule in a single reaction step, in two successive reaction steps or in three successive reaction steps.

Our beta-cyanoethylsilanes can be depicted by the general formula:

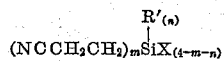

where R' represents a hydrogen atom or hydrocarbyl group, preferably a saturated aliphatic hydrocarbyl group as for example, an alkyl group, such as methyl, ethyl, propyl, butyl, pentyl and the like; a cycloalkyl group such as cyclopentyl, cyclohexyl, methylcyclopentyl, ethylcyclohexyl, and the like or an aryl group such as naphthyl, tolyl, methylnaphthyl and the like, X is a hydrolyzable group such as a halogen atom, preferably a chlorine atom or a hydrocarbyloxy group, preferably an alkoxy or an aryloxy group such as methoxy, ethoxy, propoxy, phenoxy and the like, $m$ is a whole number having a value of from 1 to 3 and $n$ is a whole number having a value of from 0 to 2, with the sum of $m$ and $n$ being not greater than 3.

Illustrative of such new cyanoalkylsilanes are beta-cyanoethyltrichlorosilane, beta-cyanoethyltriethoxysilane, beta-cyanoethylmethyldichlorosilane, beta-cyanoethylmethyldiethoxysilane, beta-cyanoethylethyldichlorosilane, beta-cyanoethylethyldipropoxysilane, beta-cyanoethylhydrogendichlorosilane, beta-cyanoethylhydrogendiethoxysilane, beta-cyanoethylphenyldichlorosilane, beta-cyanoethylphenyldipropoxysilane, beta-cyanoethyldimethylchlorosilane, beta-cyanoethyldiphenylchlorosilane, beta-cyanoethylmethylhydrogenchlorosilane, beta-cyanoethylphenylhydrogenchlorosilane, beta-cyanoethyldiphenylethoxysilane, beta-cyanoethylmethylhydrogenethoxysilane, beta-cyanoethylphenylhydrogenethoxysilane, bis(beta-cyanoethyl)diethoxysilane, bis(beta-cyanoethyl)dichlorosilane, bis(beta-cyanoethyl)methylethoxysilane, bis(beta-cyanoethyl)phenylchlorosilane, bis(beta-cyanoethyl)hydrogenchlorosilane, tris(beta-cyanoethyl)chlorosilane, tris(beta-cyanoethyl)ethoxysilane and the like.

The beta-cyanoethylchlorosilanes of our invention can be employed as the starting materials in the preparation of their corresponding beta-cyanoethylhydrocarbyloxysilanes by reacting such materials with an alcohol. By way of illustration, beta-cyanoethyltriethoxysilane is produced by reaction of beta-cyanoethyltrichlorosilane with ethanol. Such is accomplished by the steps of forming a reactive mixture of beta-cyanoethyltrichlorosilane and ethanol, with or without a solvent for the silane.

Our beta-cyanoethylsilanes, by virtue of the hydrolyzable group or groups bonded to the silicon atom thereof, can be hydrolyzed to beta-cyanoethylpolysiloxanes. Hydrolysis of our silanes is accomplished by the addition of such silanes to water. We prefer to carry out the hydrolysis reaction by first mixing the substituted silane with a liquid organic compound completely miscible therewith, as for example, diethyl ether and adding such mixture to a medium comprising a mixture of water, ice and the organic ether. By way of illustration, beta-cyanoethylpolysiloxane is produced by forming a mixture of beta-cyanoethyltrichlorosilane with diethyl ether, as for example, 100 parts of the silane and 20 parts of the ether and adding the mixture to a beaker containing a mixture of water, ice and diethyl ether. There results a two-phase system, one of the phases being aqueous hydrochloric acid and the other phase being beta-cyanoethylpolysiloxane in diethyl ether. The aqueous hydrochloric acid phase is decanted and the siloxane-solvent phase washed with water until the washings are neutral. Upon evaporation of the ether or other solvent from the non-aqueous phase, preferably under reduced pressure there is obtained as a residue a partially condensed beta-cyanoethylpolysiloxane. The partially condensed material can be completely cured to a hard brittle polymer. In a like manner, the difunctional beta-cyanoethylsilanes as well as the monofunctional beta-cyanoethylsilanes can be hydrolyzed to polymeric compositions.

The difunctional beta-cyanoethylsilanes of our invention form cyclic as well as linear polymers upon hydrolysis. For example, beta-cyanoethylmethyldiethoxysilane upon hydrolysis produced in addition to a linear beta-cyanoethylmethylpolysiloxane various cyclic siloxanes such as the cyclic trimer, tetramer, pentamer and hexamer of beta-cyanoethylmethylsiloxane. The new polymeric beta-cyanoalkylsiloxanes of our invention find use in numerous applications depending upon the type of polymers prepared. By way of illustration, the trifunctional substituted silanes upon hydrolysis and complete condensation become highly cross-linked, hard, infusible polymers. Such polymers are useful as protective coatings for metallic surfaces which are normally subjected to temperatures as high as 200° C. The new linear and cyclic siloxanes find use as oils in the lubrication of moving metal surfaces. The new monofunctional silanes as well as their hydrolysis products, namely the corresponding dimers, can be employed as endblocking compounds to control the chain length of linear beta-cyanoalkylsilanes in the production of oils.

The following examples are illustrative of the present invention.

*Example I*

To a 50 cc. steel pressure vessel were added 0.15 mole (20.3 grams) of trichlorosilane, 0.15 mole (8 grams) of acrylonitrile and 0.56 gram (2 percent by weight) of triphenylarsine. The vessel was sealed and heated, while being rocked, to a temperature of 200° C. for a period of two hours. After heating, the vessel was cooled to room temperature, the product removed therefrom and placed in a flask connected to a distillation column. The contents of the flask were heated to its boiling temperature under reduced pressure and there was obtained 7.31 grams of beta-cyanoethyltrichlorosilane boiling at a temperature of 75 to 85° C. under a reduced pressure of 5 to 7 mm. Hg.

In a similar manner trimethylarsine, triethylarsine, methyldiethylarsine and tri-n-butylarsine when respectively used in a similar process in place of triphenylarsine can produce similar results.

*Example II*

To a 500 ml. flask equipped with a condenser, a mechanical stirrer, and dropping funnel was added a solution comprising 0.20 mole (36.4 grams) of beta-cyanoethyltrichlorosilane dissolved in 75 ml. of anyhdrous ethyl ether. While stirring the mixture, 0.58 mole (26.7 grams)

of ethanol was slowly added by means of the dropping funnel. After the addition, the mixture was continually stirred for about three hours after which time it was heated to its boiling temperature under reduced pressure. There was obtained 24.2 grams of beta-cyanoethyltriethoxysilane boiling at 102° C. under a reduced pressure of 3.8 mm. Hg. Beta-cyanoethyltriethoxysilane has a density $d_4^{25}$ of 0.970 and a refractive index $n_D^{25}$ of 1.4153. Elemental analyses for carbon, hydrogen, silicon, nitrogen and ethoxy content were also conducted with the values obtained listed in the table below where they are compared with the corresponding calculated values for beta-cyanoethyltriethoxysilane:

|  | Beta-cyanoethyltriethoxysilane | |
| --- | --- | --- |
|  | Found | Calculated |
| Carbon, percent by weight | 49.5 | 49.74 |
| Hydrogen, percent by weight | 8.7 | 8.81 |
| Silicon, percent by weight | 11.8 | 12.91 |
| Nitrogen, percent by weight | 6.1 | 6.45 |
| Ethoxy, percent by weight | 62.4 | 62.21 |

Example III

To a one liter flask equipped with stirrer and reflux condenser were charged 100 cc. of a 3 percent water solution of sodium hydroxide and 187 grams (1 mole) of beta-cyanoethylmethyldiethoxysilane dissolved in 400 cc. of diethyl ether. The mixture was stirred for a period of about 4 hours after which time is was heated under reduced pressure to distill the ether and the ethyl alcohol formed during the hydrolysis reaction. The product was washed with water until neutral and then dried over anhydrous sodium sulphate. The product was then added to a flask and heated under reduced pressure to distill any residual ether or alcohol content therein. There was obtained 68 grams of a colorless oil. The oil was then placed in a flask connected to a Vigreux column and heated to its boiling temperature. There was distilled 49 grams of the cyclic tetramer of beta-cyanoethylmethylsiloxane which was identified by elemental analysis as well as by infra-red analysis. Infra-red analysis of the product remaining in the flask resulted in the identification of the cyclic pentamer, hexamer and heptamer, of beta-cyanoethylmethylsiloxane.

The cyclic tetramer of beta-cyanoethylmethylsiloxane has a boiling temperature of 277 to 280° C. under a reduced pressure of 0.2 mm. Hg and a refractive index $n_D^{25}$ of 1.4580. The values appearing below were obtained from the elemental analysis of the compound and are compared with the corresponding calculated values.

|  | Cyclic Tetramer of Beta-cyanoethylmethylsiloxane | |
| --- | --- | --- |
|  | Found | Calculated |
| Carbon, percent by weight | 42.6 | 42.3 |
| Hydrogen, percent by weight | 6.0 | 6.14 |
| Silicon, percent by weight | 23.9 | 24.5 |
| Nitrogen, percent by weight | 12.1 | 12.3 |
| Molecular weight | 474 | 456 |

Example IV

To a beaker containing 400 cc. of cracked ice and 100 cc. of diethyl ether was added, while stirring the mixture, 15.46 grams of beta-cyanoethyltrichlorosilane dissolved in 10 cc. of diethyl ether. During the addition of the solution of beta-cyanoethyltrichlorosilane hydrogen chloride was evolved. After the addition, the beaker was allowed to stand overnight during which time the diethyl ether evaporated and a thick syrup formed on the bottom of the beaker. The syrup was removed from the beaker, washed with distilled water until neutral and then desolvated under reduced pressure at a temperature of 25° C. for a period of 160 hours. There was obtained 8.08 grams of beta-cyanoethylpolysiloxane, $[NCCH_2CH_2SiO_{3/2}]_w$. Beta-cyanoethylpolysiloxane was identified by infra-red analysis and by elemental content. The table below contains the values obtained from our analysis as well as the corresponding calculated values.

|  | $[NCCH_2CH_2SiO_{3/2}]_w$ | |
| --- | --- | --- |
|  | Found | Calculated |
| Carbon, percent by weight | 29.7 | 33.9 |
| Hydrogen, percent by weight | 3.9 | 3.8 |
| Silicon, percent by weight | 25.0 | 26.4 |
| Nitrogen, percent by weight | 12.4 | 13.2 |

Example V

A sample of the beta-cyanoethylpolysiloxane prepared in the previous example was placed in a weighing bottle and the bottle placed in a forced draft air oven maintained at a temperature of 250° C. for a period of 96 hours. The weighing bottle was then removed from the oven and the polymer analyzed to determine the extent of decomposition caused by the elevated temperature. A variation in the elemental content of the polymer before and after heating is an indication of the extent of decomposition. In the sample tested, the beta-cyanoethylpolysiloxane had a carbon content of 29.7 percent by weight before heating and a carbon content of 26.3 percent by weight after heating. Such values indicate that our beta-cyanoethylpolysiloxane retains 88.3 percent of its carbon content at elevated temperatures, which makes the polymers desirable as a protective coating.

What is claimed is:

1. A process for reacting a silane, represented by the formula:

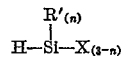

where R' represents a member of the group consisting of hydrogen and a hydrocarbyl group, X represents a hydrolyzable group from the class consisting of halogen and hydrocarbyloxy group and n represents a whole number having a value of from 0 to 2, with a mono-olefinic aliphatic nitrile having from 3 to 10 carbon atoms and containing the unsaturated olefinic grouping $$(-\overset{|}{C}=\overset{|}{C}-)$$

to produce a cyanoalkylsilane by the addition of a silyl group to the carbon atom of said unsaturated grouping further removed from the cyano group of said nitrile and by the addition of a hydrogen atom to the carbon atom of said unsaturated grouping closer to the cyano group of said nitrile, which comprises forming a mixture of said silane, said nitrile and a trihydrocarbylarsine heating said mixture to a temperature sufficiently elevated to cause said silane and nitrile to react to produce a cyanoalkylsilane by the addition of a silyl group to the carbon atom of the unsaturated grouping further removed from the cyano group of the starting nitrile and by the addition of a hydrogen atom to the carbon atom of the unsaturated grouping closer to the cyano group of the starting nitrile and recovering the cyanoalkylsilane.

2. A process for reacting a silane represented by the formula:

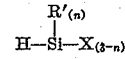

where R' represents a member of the group consisting of hydrogen and a hydrocarbyl group, X represents a hydrolyzable group from the class consisting of a halogen atom and a hydrocarbyloxy group, and n represents a whole number having a value of from 0 to 2, with a nitrile having from 3 to 10 carbon atoms and the formula:

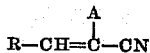

where R is a member of the group consisting of hydrogen and an alkyl group and A is a member of the group consisting of a hydrogen atom and a methyl group to produce a cyanoalkylsilane by the addition of a silyl group to the olefinic carbon atom of the nitrile further removed from the cyano group thereof and by the addition of a hydrogen atom to the olefinic carbon atom of the nitrile closer to the cyano group thereof which comprises forming a mixture of said silane, nitrile, and a trihydrocarbylarsine, heating said mixture to a temperature sufficiently elevated to cause said silane and nitrile to react to produce a cyanoalkylsilane by addition of a silyl group to the olefinic carbon atom further removed from the cyano group of the starting nitrile and by the addition of a hydrogen atom to the olefinic carbon atom closer to the cyano group of the starting nitrile.

3. A process for producing a beta-cyanoethylsilane which comprises forming a mixture of a silane of the formula:

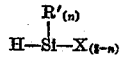

where R' represents a member of the group consisting of hydrogen and a hydrocarbyl group, X represents a hydrolyzable group from the class consisting of a halogen atom and a hydrocarbyloxy group and $n$ represents a whole number having a value of from 0 to 2, acrylonitrile and a trialkylarsine catalyst, heating said mixture to a temperature sufficiently elevated to cause said silane and acrylonitrile to react to produce a beta-cyanoethylsilane.

4. A process for producing a beta-cyanoethylsilane which comprises forming a mixture of a silane of the formula:

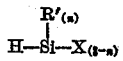

where R' represents a member of the group consisting of hydrogen and a hydrocarbyl group, X represents a hydrolyzable group taken from the class consisting of a halogen atom and a hydrocarbyloxy group and $n$ represents a whole number having a value of from 0 to 2, acrylonitrile and a triarylarsine catalyst, heating said mixture to a temperature sufficiently elevated to cause said silane and acrylonitrile to react to produce a beta-cyanoethylsilane.

5. A process for producing gamma-cyanopropylsilane which comprises forming a mixture of a silane of the formula:

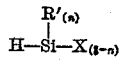

where R' represents a member of the group consisting of hydrogen and a hydrocarbyl group, X represents a hydrolyzable group taken from the class consisting of a halogen atom and a hydrocarbyloxy group and $n$ represents a whole number having a value of from 0 to 2, allyl cyanide and triarylarsine, heating said mixture to a temperature sufficiently elevated to cause said silane and allyl cyanide to react to produce a gamma-cyanopropylsilane.

6. A process for producing gamma-cyanopropylsilane which comprises forming a mixture of a silane of the formula:

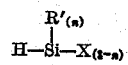

where R' represents a member of the group consisting of hydrogen and a hydrocarbyl group, X represents a hydrolyzable group taken from the class consisting of a halogen atom and a hydrocarbyloxy group and $n$ represents a whole number having a value of from 0 to 2, allyl cyanide and trialkylarsine, heating said mixture to a temperature sufficiently elevated to cause said silane and allyl cyanide to react to produce a gamma-cyanopropylsilane.

7. A process for producing beta-cyanoethyltrichlorosilane which comprises forming a mixture of acrylonitrile, trichlorosilane and triphenylarsine, heating said mixture to a temperature sufficiently elevated to cause said acrylonitrile and trichlorosilane to react to produce beta-cyanoethyltrichlorosilane.

8. A process for producing beta-cyanoethyltrichlorosilane which comprises forming a mixture of trichlorosilane, acrylonitrile and about 0.2 to 10 weight percent of triphenylarsine based on the mixture weight, heating said mixture to a temperature sufficiently elevated to cause the acrylonitrile and trichlorosilane to react to produce beta-cyanoethyltrichlorosilane.

References Cited in the file of this patent
UNITED STATES PATENTS

| | | |
|---|---|---|
| 2,524,529 | Krieble | Oct. 3, 1950 |
| 2,532,583 | Tyran | Dec. 5, 1950 |
| 2,632,013 | Wagner et al. | Mar. 17, 1953 |
| 2,675,372 | Coover et al. | Apr. 13, 1954 |
| 2,716,638 | Cohen et al. | Aug. 30, 1955 |
| 2,721,873 | MacKenzie et al. | Oct. 25, 1955 |
| 2,823,218 | Speier et al. | Feb. 11, 1958 |

UNITED STATES PATENT OFFICE
CERTIFICATE OF CORRECTION

Patent No. 2,911,426                                                          November 3, 1959

Victor B. Jex et al.

It is hereby certified that error appears in the above numbered patent requiring correction and that the said Letters Patent should read as corrected below.

In the grant, lines 1, 2, and 3, for "Victor B. Jex and John E. McMahon, of Buffalo, New York," read -- Victor B. Jex and John E. McMahon, of Buffalo, New York, assignors to Union Carbide Corporation, a corporation of New York, --; line 12, for "Victor B. Jex and John E. McMahon, their heirs" read -- Union Carbide Corporation, its successors --; in the heading to the printed specification, line 5, for "Victor B. Jex and John E. McMahon, Buffalo, N. Y." read -- Victor B. Jex and John E. McMahon, Buffalo, N. Y., assignor to Union Carbide Corporation, a corporation of New York --.

Signed and sealed this 27th day of December 1960.

(SEAL)
Attest:

KARL H. AXLINE                                              ROBERT C. WATSON
Attesting Officer                                  Commissioner of Patents